US012783302B2

(12) United States Patent
Fuchs et al.

(10) Patent No.: US 12,783,302 B2

(45) Date of Patent: Nov. 3, 2026

(54) TIMER QUEUE FOR SELF-RESCHEDULING EVENT TASKS

(71) Applicant: Oracle International Corporation, Redwood Shores, CA (US)

(72) Inventors: Daniel Jean-Michel Fuchs, Dublin (IE); Daniel Jeliński, Gdańsk (PL); Jaikiran Pai, Dharwad (IN)

(73) Assignee: Oracle International Corporation, Redwood Shores, CA (US)

( * ) Notice: Subject to any disclaimer, the term of this patent is extended or adjusted under 35 U.S.C. 154(b) by 307 days.

(21) Appl. No.: 18/743,643

(22) Filed: Jun. 14, 2024

(65) Prior Publication Data

US 2025/0383917 A1 Dec. 18, 2025

(51) Int. Cl.
*G06F 9/48* (2006.01)

(52) U.S. Cl.
CPC .................................. *G06F 9/4887* (2013.01)

(58) Field of Classification Search
None
See application file for complete search history.

(56) References Cited

U.S. PATENT DOCUMENTS 4,322,831 A 3/1982 Peterson
5,768,572 A * 6/1998 George ................. G06F 9/4825 713/502
5,781,769 A * 7/1998 Weber .................. G05B 19/042 713/502
7,793,299 B2 * 9/2010 Howland .............. G06F 9/4881 710/200
7,844,973 B1 11/2010 Dice
7,912,064 B2 3/2011 Elzur
(Continued)

FOREIGN PATENT DOCUMENTS

CN 102710410 A 10/2012
CN 105069081 A 11/2015
(Continued)

OTHER PUBLICATIONS

"Package java.util.concurrent", Jun. 19, 2024, pp. 10.
(Continued)

*Primary Examiner* — Van H Nguyen
(74) *Attorney, Agent, or Firm* — Invoke

(57) ABSTRACT

Techniques for implementing a timer queue for self-rescheduling event tasks are disclosed. In some embodiments, a method comprises the following: storing events in a queue of scheduled events, where each event comprises a corresponding task that is scheduled to be executed at a particular deadline, the events being ordered by their corresponding particular deadline; determining that a condition for rescheduling has been satisfied for a first event in the plurality of events; and responsive to the determining that the condition for rescheduling has been satisfied for the first event: removing the first event from the queue of scheduled events; refreshing the corresponding particular deadline of the first event after the first event has been removed from the queue of scheduled events; and adding the first event to a collection of rescheduled events after the corresponding particular deadline of the first event has been refreshed.

20 Claims, 4 Drawing Sheets

(56) References Cited

U.S. PATENT DOCUMENTS

| | | | | |
|---|---|---|---|---|
| 8,195,636 | B2 * | 6/2012 | Stager | G06F 9/5022 707/707 |
| 8,640,230 | B2 | 1/2014 | Greenwood et al. | |
| 9,348,321 | B2 | 5/2016 | Dougan et al. | |
| 9,553,951 | B1 | 1/2017 | Nguyen et al. | |
| 9,756,153 | B2 | 9/2017 | Dougan et al. | |
| 9,898,349 | B2 | 2/2018 | Gentile et al. | |
| 9,952,912 | B2 | 4/2018 | Omara et al. | |
| 10,671,525 | B2 * | 6/2020 | Fischer-Toubol | G06F 12/0238 |
| 10,789,210 | B2 * | 9/2020 | Yan | G06F 3/067 |
| 10,936,480 | B2 * | 3/2021 | Syamala | G06Q 30/0645 |
| 11,050,682 | B2 | 6/2021 | Kantecki et al. | |
| 11,263,061 | B2 | 3/2022 | Richter | |
| 11,726,905 | B2 * | 8/2023 | Syamala | G06F 12/0238 711/103 |
| 12,326,806 | B2 * | 6/2025 | Syamala | G06F 12/0238 |
| 2004/0123306 | A1 | 6/2004 | Gazda et al. | |
| 2004/0141486 | A1 | 7/2004 | Suri et al. | |
| 2006/0149526 | A1 | 7/2006 | Torossian et al. | |
| 2006/0256722 | A1 | 11/2006 | Taha et al. | |
| 2007/0050528 | A1 | 3/2007 | Lameter | |
| 2008/0162481 | A1 | 7/2008 | Sadjadi | |
| 2009/0158075 | A1 | 6/2009 | Biberstein et al. | |
| 2009/0161568 | A1 | 6/2009 | Kastner | |
| 2011/0137581 | A1 | 6/2011 | Chung et al. | |
| 2011/0285731 | A1 | 11/2011 | Andre et al. | |
| 2012/0078665 | A1 | 3/2012 | Johnson et al. | |
| 2013/0308921 | A1 | 11/2013 | Jeffrey | |
| 2013/0346764 | A1 | 12/2013 | Gullbrand et al. | |
| 2014/0019793 | A1 | 1/2014 | De et al. | |
| 2017/0031729 | A1 | 2/2017 | Grochowski et al. | |
| 2017/0109209 | A1 | 4/2017 | Bailey et al. | |
| 2018/0158300 | A1 | 6/2018 | Laska et al. | |
| 2019/0243682 | A1 | 8/2019 | Botelho | |
| 2020/0067634 | A1 | 2/2020 | Medard et al. | |
| 2020/0151366 | A1 | 5/2020 | Chen et al. | |
| 2022/0377019 | A1 | 11/2022 | Rao et al. | |
| 2023/0376348 | A1 | 11/2023 | Nield et al. | |

FOREIGN PATENT DOCUMENTS

| | | | |
|---|---|---|---|
| CN | 110622449 | A | 12/2019 |
| CN | 111949391 | A | 11/2020 |
| CN | 115714826 | A | 2/2023 |
| KR | 10-0366018 | B1 | 12/2002 |
| WO | 2004/094863 | A2 | 11/2004 |
| WO | 2018/019342 | A1 | 2/2018 |

OTHER PUBLICATIONS

"quartz.net", Retrieved from https://www.quartz-scheduler.net/, Retrieved on Feb. 23, 2024, pp. 2.

"Rescheduling Jobs", Retrieved from https://www.quartz-scheduler.net/documentation/quartz-3.x/how-tos/rescheduling-jobs.html, Retrieved on Feb. 18, 2024, pp. 2.

"TASKER", Retrieved from https://tasker.joaoapps.com/, Retrieved on Jun. 24, 2024, pp. 1-3.

"The magic behind Monotonics", Retrieved from https://rtic.rs/2/book/en/monotonic_impl.html, Retrieved on Feb. 23, 2024, pp. 2.

"Use Tasker to wake up my device at specified intervals", Retrieved from https://groups.google.com/g/tasker/c/rZOD9WsJ8Ow?pli=1, Retrieved on Jun. 24, 2024, pp. 1-4.

Dfuchs, "OpenJDK / jdk9 / jdk9 / hotspot", changeset 7765:fca33371ff0b, 2015, available online at <http://hg.openjdk.java.net/jdk9/jdk9/hotspot/rev/fca33371ff0b>, 5 pages.

Dfuchs, "OpenJDK / jdk9 / jdk9 / jdk", changeset 11354:d6a5cbeb8198, 2015, available online at <http://hg.openjdk.java.net/jdk9/jdk9/jdk/rev/d6a5cbeb8198> 11 pages.

Frincu et al., "Self-Healing Distributed Scheduling Platform", Jun. 17, 2011, pp. 11.

Hedayati et al., "Multi-Queue Fair Queuing", 2019 USENIX Annual Technical Conference, Jul. 10-12, 2019, pp. 301-314.

Is there any consistent (monotonic) Clock implementation in Java?, available online at <https://stackoverflow.com/questions/34778744/is-there-any-consistent-monotonic-clock-implementation-in-java>, 4 pages.

JDK-8068730, "Increase the precision of the implementation of java.time.Clock.systemUTC", 2015, available online at <https://bugs.openjdk.java.net/browse/JDK-8068730>, 4 pages.

Kohutka et al., "A New FPGA-Based Task Scheduler for Real-Time Systems", Task Scheduler for Real-Time Systems. Electronics Apr. 15, 2023, vol. 12, 1870, pp. 1-18.

Lotan et al., "Skiplist-Based Concurrent Priority Queues", Proceedings 14th International Parallel and Distributed Processing Symposium. IPDPS, 2000, pp. 23.

Mioli S., "Rescheduling a Quartz.NET Job From Within Itself", Retrieved from https://www.linkedin.com/pulse/rescheduling-quartznet-job-from-within-itself-stefano-mioli, Mar. 27, 2023, pp. 1-7.

Russ Cox, "Proposal: Monotonic Elapsed Time Measurements in Go", Last updated: Jan. 26, 2017, 32 pages.

Schmidt et al., "The Design and Use of the ACE Reactor An Object-Oriented Framework for Event Demultiplexing", 1998, pp. 1-21.

Wu et al., "Decentralized Max-Min Resource Allocation for Monotonic Utility Functions", IEEE INFOCOM 2021—IEEE Conference on Computer Communications Workshops (INFOCOM WKSHPS), Jul. 19, 2021, pp. 3.

Zheng et al., "LuisaRender: A High-Performance Rendering Framework with Layered and Unified Interfaces on Stream Architectures", ACM Trans. Graph., vol. 41, No. 6, Article 232, Dec. 2022, pp. 1-19.

"On the design and implementation of the QUIC protocol," Retrieved from https://quic.edm.uhasselt.be/files/quicker_KevinPittevils_August2018.pdf, UHASSELT, 2018, 69 pages.

* cited by examiner

TIMER QUEUE FOR SELF-RESCHEDULING EVENT TASKS

TECHNICAL FIELD

The present disclosure relates to a timer system. In particular, the present disclosure relates to a timer system that implements a timer queue for self-rescheduling event tasks.

BACKGROUND

Timers are used by computer systems to schedule tasks for future execution. A task is a unit of work to be executed, such as within a software application or within some other computing environment. A task may comprise a set of program instructions that are loaded into memory and then run.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
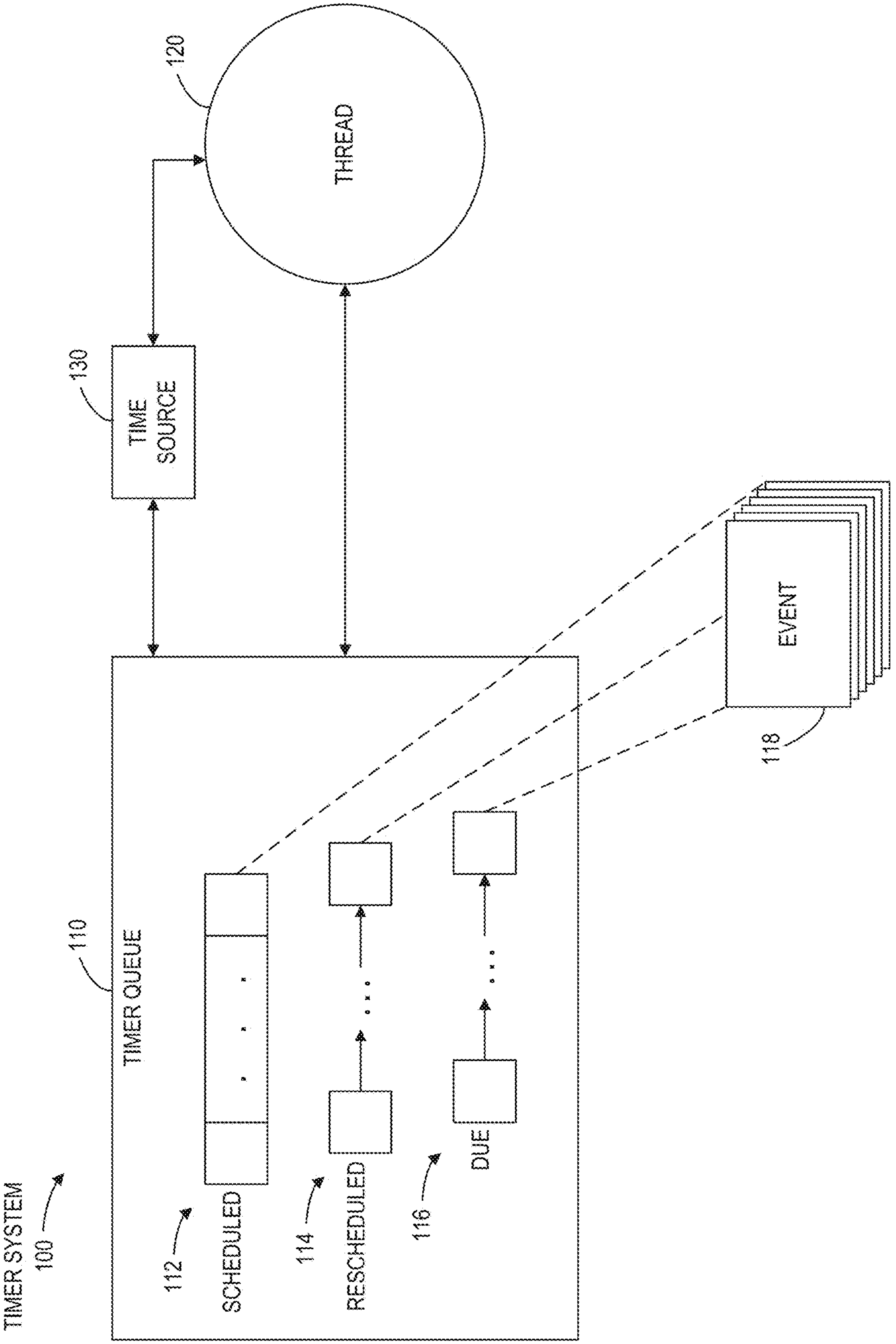
FIG. 1 illustrates a timer system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. General Overview
2. Timer System Architecture
3. Rescheduling Tasks Using a Timer Queue
4. Example Embodiment
5. Computer Networks and Cloud Networks
6. Hardware Overview
7. Miscellaneous; Extensions

1. General Overview

One or more embodiments include a timer system that allows tasks to reschedule themselves, rather than using a traditional schedule and cancel technique employed by traditional timers. Tasks may need to be cancelled or pushed backward or forward in time if, for instance, an event occurs that obsoletes the task action or makes the task action more or less urgent. For example, in implementing networking protocols where two entities communicate over a network, some processing tasks may need to be triggered if an expected message is not received within the imparted delay, an expected packet acknowledgment is received, or if a new connection control needs to be sent early. For high level protocols, such as the Hypertext Transfer Protocol (HTTP), this scenario usually translates into dealing with connections that take too long to get established, responses that take too long to arrive from a peer, or shutting down idle connections. These situations may result in timeouts. The granularity of such timeouts are usually in the range of several seconds, possibly even minutes. For lower level protocols such as the Transmission Control Protocol (TCP), or the QUIC (Quick UDP Internet Connections) protocol (an encrypted connection-based protocol based on the User Datagram Protocol (UDP)), the granularity at which tasks need to be triggered can be much finer, in the range of milliseconds or less. Such tasks include, but are not limited to, detecting that a packet has been lost, retransmitting a packet if an acknowledgement is not received in time, and sending probes or pings to solicit an acknowledgement.

Registering one task for each of these events causes a drag on system resources, causing idle wake-ups and a waste of resources if tasks no longer need to be executed at the time at which they were programmed. The system disclosed here uses three concurrent collections (a queue of scheduled events, a collection of rescheduled events, and a collection of events that are due to be processed) to enable rescheduling of events without having to lock the queues while processing events. When using sorted queues, priority queues, or skip lists, a registered event must not change any data that is used to compute its distance to other events. The system described here ensures that the deadline of a given event is refreshed only when the event has been removed from any such collection, and ensures that the event is added back to the appropriate collection after its deadline has been refreshed.

In an embodiment, a system stores events in a queue of scheduled events, with each event comprising a task that is scheduled to be executed at a particular deadline. The events are ordered in the queue of scheduled events by their deadlines from earliest deadline at the head of the queue to latest deadline at the tail of the queue. The system determines that a first event satisfies a condition for rescheduling at a new deadline (e.g., the system has received a message that indicates that the event should be rescheduled, and the message contains the prospective new deadline at which the event should be rescheduled, if known). In some embodiments, the first event is present in the queue of scheduled events. In other embodiments, the first event is not present in the queue of scheduled events, as it may have been previously removed from the queue of scheduled events if it did not have any deadline at a previous processing of the queue. In response to the determination that the first event satisfies the condition for rescheduling, the system adds the event to a collection of rescheduled events. If the prospective deadline is unknown, or if the prospective deadline is earlier than the deadline of all scheduled or rescheduled events, then the system notifies a thread that rescheduled events need to be processed. The system keeps track of the earliest deadline of all scheduled events or prospective deadline of all rescheduled events in order to determine whether the thread needs to be notified. When the thread is notified, or when it is woken up at its next deadline or by an external event, the system receives in turn from that thread an instruction to process events where the instruction comprises a current time instant. In response to receiving the instruction to process events, the system starts processing all rescheduled events, removing the first event from the collection of rescheduled events, then removing it from the collection of scheduled events (if present), and then asking the event to refresh its deadline. Then, depending on the refreshed deadline, the system either (a) adds the first event to the queue of scheduled events based on a determination that the refreshed particular deadline of the first event is after the first current time instant or (b) adds the first event to a collection of events that are due to be processed based on a determination that the refreshed particular deadline of the first event is at or before the first current time instant.

One or more embodiments described in this Specification and/or recited in the claims may not be included in this General Overview section.

2. Data Synchronization Architecture

FIG. 1 illustrates a timer system 100 in accordance with one or more embodiments. As illustrated in FIG. 1, timer system 100 includes a timer queue 110, a thread 120, and a time source 130. In one or more embodiments, the timer system 100 may include more or fewer components than the components illustrated in FIG. 1. The components illustrated in FIG. 1 may be local to or remote from each other. The components illustrated in FIG. 1 may be communicatively coupled to each other via a direct connection or via a network. The components illustrated in FIG. 1 may be implemented in software and/or hardware. Each component may be distributed over multiple applications and/or machines. Multiple components may be combined into one application and/or machine. Operations described with respect to one component may instead be performed by another component.

The timer queue 110 may be implemented using classes of objects in an object-oriented programming language, such as JAVA®. Alternatively, the timer queue 110 may be implemented using other types of programming paradigms. In one or more embodiments, the timer queue 110 uses a queue 112 of scheduled events, a collection 114 of rescheduled events, and a collection 116 of events that are due to be processed to manage the scheduling, rescheduling, execution, and cancelation of events 118. Each event 118 may comprise an object that indicates an action or occurrence recognized by a computer system and for which a task may be executed. In some embodiments, each event 118 includes a corresponding task that is scheduled to be executed at a corresponding particular deadline. For example, when a packet is sent from a computer system that uses the timer system 100, the timer system 100 may create an event 118 that includes a task to re-send the packet if an acknowledgment has not been received within a specified period of time, such that the task of resending the packet has a particular deadline based on the specified period of time. The timer system 100 creates the event 118 and adds it to the queue 112 of scheduled events.

Each event 118 managed by the timer queue 110 may be an instance of the same class of object, referred to herein as a TimedEvent class. A TimedEvent instance represents a task that is scheduled to be executed at a given deadline. In some embodiments, the timer queue 110 models deadlines as time instants provided by the time source 130. The time source 130 is configured to provide time instants to the timer queue 110 and the thread 120. A time instant is a single, atomic point in time. In some example embodiments, the time source 130 comprises a monotonic timeline clock, thereby ensuring that instants obtained from the time source 130 never go backward, such as due to updates caused by Network Time Protocol or Daylight Savings Time. One example of a monotonic timeline clock that may be used as the time source 130 is described in U.S. Pat. No. 11,119,531 B2 to Fuchs et al., which is incorporated by reference in its entirety as if set forth herein. Such time instants provided by the monotonic timeline clock are represented by a number of seconds elapsed since a particular moment in time, plus a number of nanoseconds between 0 and 999,999,999 (1 second-1 nanosecond). As such, there exists a maximum instant and a minimum instant that can be represented. These minimum and maximum instants are used as sentinel values by the timer system 100. By using a monotonic timeline clock instead of the regular computer system clock, the timer system 100 ensures that delays, such as durations computed between two different instants, are not affected by changes to the computer system clock, caused, for instance, by updates requested by the Network Time Protocol. In one example, an instant B obtained from the monotonic timeline clock after an instant A obtained from the same monotonic timeline clock is guaranteed to never be before the instant A.

The TimedEvent class may be represented as a sealed interface to ensure that all instances of the TimedEvent class, whatever their concrete implementation, participate in a total order. A sealed class or interface restricts which other classes or interfaces may extend or implement them. In some embodiments, instances of the TimedEvent class may have both a deadline and an identification (ID), such as a long integer that is statically incremented for each new instance of TimedEvent. In one or more embodiments, instances of TimedEvent are ordered by their deadline, and, in the event that their deadlines are identical, by their IDs, thereby ensuring that two events that need to be fired at the same time can still be ordered, where one will be found strictly smaller or strictly greater than the other based on their IDs, thus ensuring a total ordering of events 118. A TimedEvent may provide its deadline and its ID, as well as a refresh method that can be called to make the event refresh its deadline. Refreshing the deadline may include changing the deadline to a different value, such as moving the deadline forward or backward in time. A TimedEvent may also include a handle method that can be invoked to fire the event 118 when its deadline is reached. The handle method returns the new deadline for the event 118 as computed after firing the event 118. That deadline represents the next time at which the event 118 should be fired. The maximum deadline can be returned to indicate that the event 118 no longer needs to remain registered with the timer queue 110. If the timer system 100 later determines that the event 118 is again of interest, then the timer system 100 may again offer the event 118 to the timer queue 110.

In one or more embodiments, the queue 112 of scheduled events comprises a skip list. A skip list is a probabilistic data structure that allows for efficient search, insertion, and deletion of elements in a sorted list. In a skip list, elements are organized in layers, with each layer having a smaller number of elements than the one below it. The bottom layer is a regular linked list, while the layers above it contain “skipping” links that allow for fast navigation to elements that are far apart in the bottom layer, thereby allowing for quick traversal to the desired element and reducing the average number of steps needed to reach it. The use of a skip list allows the timer queue 110 to quickly access an event 118 registered in the queue 112 of scheduled events, whether the event 118 is at the head, at the tail, or in the middle of the queue 112 of scheduled events, which is useful when removing events 118 from the queue 112 of scheduled events in order to reschedule them.

In some embodiments, the collection 114 of rescheduled events includes a collection of events 118 that have been removed from the queue 112 of scheduled events and rescheduled. A collection is a grouping of some variable number of data items that have some shared significance to a problem being solved and need to be operated upon together in some controlled fashion. Generally, the data items are of the same type or, in languages supporting inheritance, derived from some common ancestor type. Examples of collections include lists, sets, and queues. In one example, the collection 114 of rescheduled events comprises a hash set. Hash sets are sets that use hashes to store elements. A hashing algorithm is an algorithm that takes an element and converts it to a chunk of fixed size called a hash. For every element in a hash set, the hash is computed and elements with the same hash are grouped together. This group of similar hashes is called a bucket and they are usually stored as linked lists. Other implementations of the collection 114 of rescheduled events are also within the scope of the present disclosure.

In one or more embodiments, the collection 116 of events that are due to be processed includes a collection of events 118 that have been removed from either the queue 112 of scheduled events or the collection 114 of rescheduled events and added to the collection 116 of events that are due to be processed based on a determination that the corresponding deadlines of the events 118 are at or before the current time instant. In some embodiments, the collection 116 of events that are due to be processed is a queue. However, other implementations of the collection 116 of events that are due to be processed are also within the scope of the present disclosure.

The timer queue 110 may be integrated into any thread 120 that can be woken up to perform an action. In some embodiments, the timer queue 110 integrates with an external thread 120 of execution that invokes the timer queue 110 to process, purge, and trigger all events. In one or more embodiments, the thread 120 of execution invokes the timer queue 110 when the earliest deadline in the queue 112 of scheduled events is reached. In some embodiments, the thread 120 of execution is a selector thread that manages multiple data transfer channels. The selector thread monitors one or more input/output (I/O) channels and recognizes when one or more of the I/O channels becomes available for data transfer. In one example in which the QUIC protocol is implemented, the thread 120 of execution is a selector thread that is already waiting for incoming packets. The selector thread arranges to wake up and invoke the queue 112 of scheduled events at the earliest deadline returned by a method that processes, purges, and triggers all due events 118, such as all events 118 having a deadline that is at or before the current time instant. In some embodiments, the selector thread is woken up asynchronously if a new event 118 with a deadline less than any other events 118 in the queue 112 of scheduled events is offered to the queue 112 of scheduled events. The selector thread then has the ability to wait for a shorter delay than that it was previously waiting for, based on the new earliest deadline of events 118 scheduled in the queue 112 of scheduled events.

In one or more embodiments, the timer system 100 refers to hardware and/or software configured to perform operations described herein for self-rescheduling event tasks. Examples of operations for self-rescheduling event tasks, as well as further details of the features and functions of the timer system 100, are described below with reference to FIGS. 2 and 3.

Additional embodiments and/or examples relating to computer networks are described below in Section 5, titled "Computer Networks and Cloud Networks."

In an embodiment, the timer queue 110, the thread 120, and the time source 130 are each implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

Figure 2:
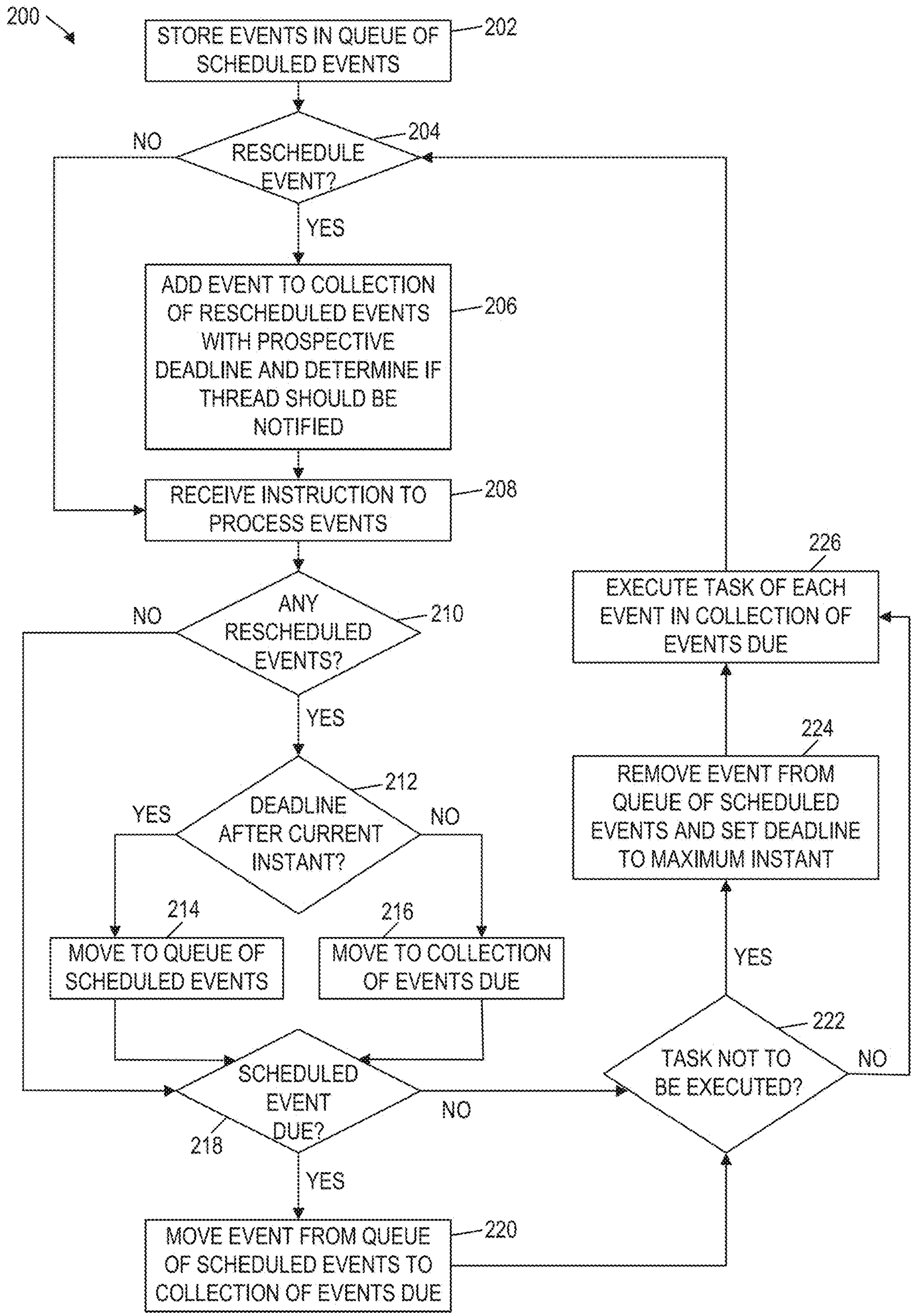
FIG. 2 illustrates an example set of operations for implementing a timer queue for self-rescheduling event tasks in accordance with one or more embodiments.

3. Data Synchronization Using Transaction Identifications within Data Objects FIG. 2 illustrates an example set of operations for implementing a timer queue for self-rescheduling event tasks in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the timer system 100 stores a plurality of events 118 in a queue 112 of scheduled events (Operation 202). Each event 118 in the plurality of events 118 includes a corresponding task that is scheduled to be executed at a corresponding particular deadline. The plurality of events 118 are ordered in the queue 112 of scheduled events by their corresponding particular deadline. For example, the plurality of events 119 in the queue 112 of scheduled events may be ordered from earliest particular deadline at a head of the queue 112 to latest particular deadline at a tail of the queue 112.

In one or more embodiments, the timer system 100 determines if a condition for rescheduling has been satisfied for an event 118 in the plurality of events 118 in the queue 112 of scheduled events (Operation 204). One example of the condition for rescheduling is receiving an acknowledgment that a packet that was previously sent based on an event 118 processed by the timer queue 110 has been successfully transmitted to its intended destination. The thread 120 may receive a packet that includes this acknowledgement, wake up, and pass the packet to the appropriate connection. Based on the acknowledgement included in the packet, the connection may instruct the timer queue 110 to reschedule the corresponding event 118. Other conditions for rescheduling are also within the scope of the present disclosure.

In some embodiments, if the timer system 100 determines that the condition for rescheduling at a new prospective deadline has been satisfied for the event 118 in the queue 112, then the timer system 100 adds the event 118 to the collection 114 of rescheduled events (Operation 206). If the prospective deadline is unknown, or if the prospective deadline is less than the next deadline at which scheduled events should be processed (e.g., the prospective deadline is less than the deadline of the first event in the queue 112), then the timer system 100 notifies the thread 120 that events need to be processed.

In one or more embodiments, following the adding of the event 118 to the collection 114 of rescheduled events (Operation 206) or following a determination by the thread 120 that the next deadline has been reached, the timer system 100 receives, from the thread 120, an instruction to process events (Operation 208). The instruction to process events comprises a current time instant. The current time instant may have been obtained by the thread 120 from a monotonic timeline clock of the time source 130. The timer system 100 may receive the instruction to process events from the thread 120 following a determination that the condition for rescheduling has not been satisfied for the event 118 in the queue 112, such as at a later time when the thread 120 detects that the deadline returned by a previous invocation of a method to process, purge, and trigger all events 118 whose deadline is before a given deadline (e.g., the current time instant) and to return the next deadline, which is the earliest deadline of all submitted events 118 whose deadline is after the given deadline (e.g., the current time instant) has been reached. This method is referred to below as processEventsAndReturnNextDeadline. The timer system 100 may also receive the instruction to process events from the thread 120 when the thread 120 has been woken up by some external event (e.g., when the thread 120 is notified that some data from the network is available for reading).

In some embodiments, the timer system 100 determines if there are any events 118 in the collection 114 of rescheduled events (Operation 210). For example, the timer queue 110 may search the collection 114 of rescheduled events or access a count of events maintained by the collection 114 of rescheduled events to determine if there are any events 118 in the collection 114 of rescheduled events. The timer system 100 may use other techniques for determining if there are any events 118 in the collection 114.

If the timer system 100 determines that the collection 114 of rescheduled events includes one or more events 118, then, for each event 118 in the collection 114, the timer system 100 removes the event 118 from the collection 114 of rescheduled events, removes the event 118 from the queue 112 of scheduled events (if present in the queue 112), and asks or otherwise triggers the event 118 to refresh its deadline. Depending on the new refreshed deadline of the event 118, the timer system 100 then either adds the event 118 to the queue 112 of scheduled events or adds the event 118 to the collection 116 of events that are due to be processed, or simply omits the event 118 from the queue 112 and the collections 114 and 116 (if the refreshed deadline is the maximum instant). In some embodiments, the timer system 100 determines if the particular deadline of the event 118 is after the current time instant that was included in the instruction to process events. If the timer system 100 determines that the particular deadline of the event 118 is after the current time instant, then the timer system 100 moves the event 118 to the queue 112 of scheduled events (Operation 214), such as by adding the event 118 to the queue 112 of scheduled events based on the determination that the particular deadline of the event 118 is after the current time instant.

If the timer system 100 determines that the particular deadline of the event 118 is not after the current time instant (e.g., the particular deadline of the event 118 is at or before the current time instant), then the timer system 100 moves the event 118 to the collection 116 of events that are due to be processed (Operation 216), such as by adding the event 118 to the collection 116 of events that are due to be processed based on the determination that the particular deadline of the event 118 is not after the current time instant.

In one or more embodiments, following the moving of the event 118 to the queue 112 of scheduled events (Operation 214) or the moving of the event 118 to the collection 116 of events that are due to be processed (Operation 216) or a determination that there are not any events in the collection 114 of rescheduled events (Operation 210), the timer system 110 determines if there are any events 118 in the queue 112 of scheduled events that are due to be processed (Operation 218). The timer system 100 makes this determination by determining if the deadline of any events 118 in the queue 112 of scheduled events is at or before the current time instant. For example, if the timer system 100 determines that the deadline of an event 118 in the queue 112 of scheduled events is at or before the current time instant, then the timer system 100 determines that the event 118 is due to be processed. If the timer system 100 determines that the deadline of the event 118 is after the current time instant, then the timer system 100 determines that the event 118 is not due to be processed.

If the timer system 100 determines that the event 118 in the queue 112 of scheduled events is due to be processed, then the timer system 100 moves the event 118 from the queue 112 of scheduled events to the collection 116 of events that are due to be processed (Operation 220). For example, the timer system 100 removes the event 118 from the collection 114 of rescheduled events. The timer system 100 then adds the event 118 to the collection 116 of events that are due to be processed based on the determination that the particular deadline of the event 118 is at or before the current time instant.

In some embodiments, following the moving of the event 118 from the queue 112 of scheduled events to the collection 116 of events that are due to be processed (Operation 220) or a determination that there are not any events 118 in the queue 112 of scheduled events that are due to be processed (Operation 218), the timer system 100 determines if any tasks of the events 118 in the queue 112 of scheduled events no longer need to be executed (Operation 222). The determination that a task of an event 118 in the queue 112 of scheduled events no longer needs to be executed may be based on an instruction, received by the timer queue 100, indicating that the task of the event 118 no longer needs to be executed. For example, the timer queue 100 may receive an instruction to cancel the task of the event 118. The instruction to cancel the task of the event 118 may be sent to the timer queue 100 in response to the thread 120 receiving an external event that triggers the transmission of the instruction. Other ways of determining that a task of an event 118 in the queue 112 of scheduled events no longer needs to be executed are also within the scope of the present disclosure.

In one or more embodiments, if the timer system 100 determines that a task of an event 118 in the queue 112 of scheduled events does not need to be executed, then the timer system 100 removes the event 118 from the queue 112 of scheduled events, and sets the corresponding particular deadline of the event 118 to a maximum instant (Operation 224). The timer system 100 obtains the maximum instant from a monotonic timeline clock of the time source 130. By removing the event 118 from the queue 112 of scheduled events, as well as omitting the event 118 from the collections

114 and 116, and setting the deadline of the event 118 to the maximum instant, the timer system 100 effectively unregisters the event 118 from the timer queue 110. If the timer system 100 subsequently determines that there is a subsequent need to execute the task of the event 118, then the timer system 100 may again register the event 118 with the timer queue 110, such as by adding the event 118 with a prospective deadline to the collection 114 of rescheduled events (Operation 206).

In some embodiments, following the removal of the event 118 from the queue 112 of scheduled events and setting the corresponding particular deadline of the event 118 to the maximum instant (Operation 224) or a determination that there are not any tasks of the events 118 in the queue 112 of scheduled events that no longer need to be executed (Operation 222), the timer system 100 executes the corresponding task of each event 118 in the collection 116 of events that are due to be processed (Operation 226). In one or more embodiments, if an executor was provided by the thread 120 as part of the instruction to process events, then the timer system 100 uses the executor to execute the tasks of the events 118 that are in the collection 116 of events that are due to be processed. An executor is an object that executes submitted runnable tasks. The executor acts as an interface that provides a way of decoupling task submission from the mechanics of how each task will be run, including details of thread use and scheduling, among others. The executor may be used by the timer queue 110 instead of explicitly creating threads.

4. Example Embodiment

A detailed example is described below for purposes of clarity. Components and/or operations described below should be understood as one specific example that may not be applicable to certain embodiments. Accordingly, components and/or operations described below should not be construed as limiting the scope of any of the claims.

Figure 3:
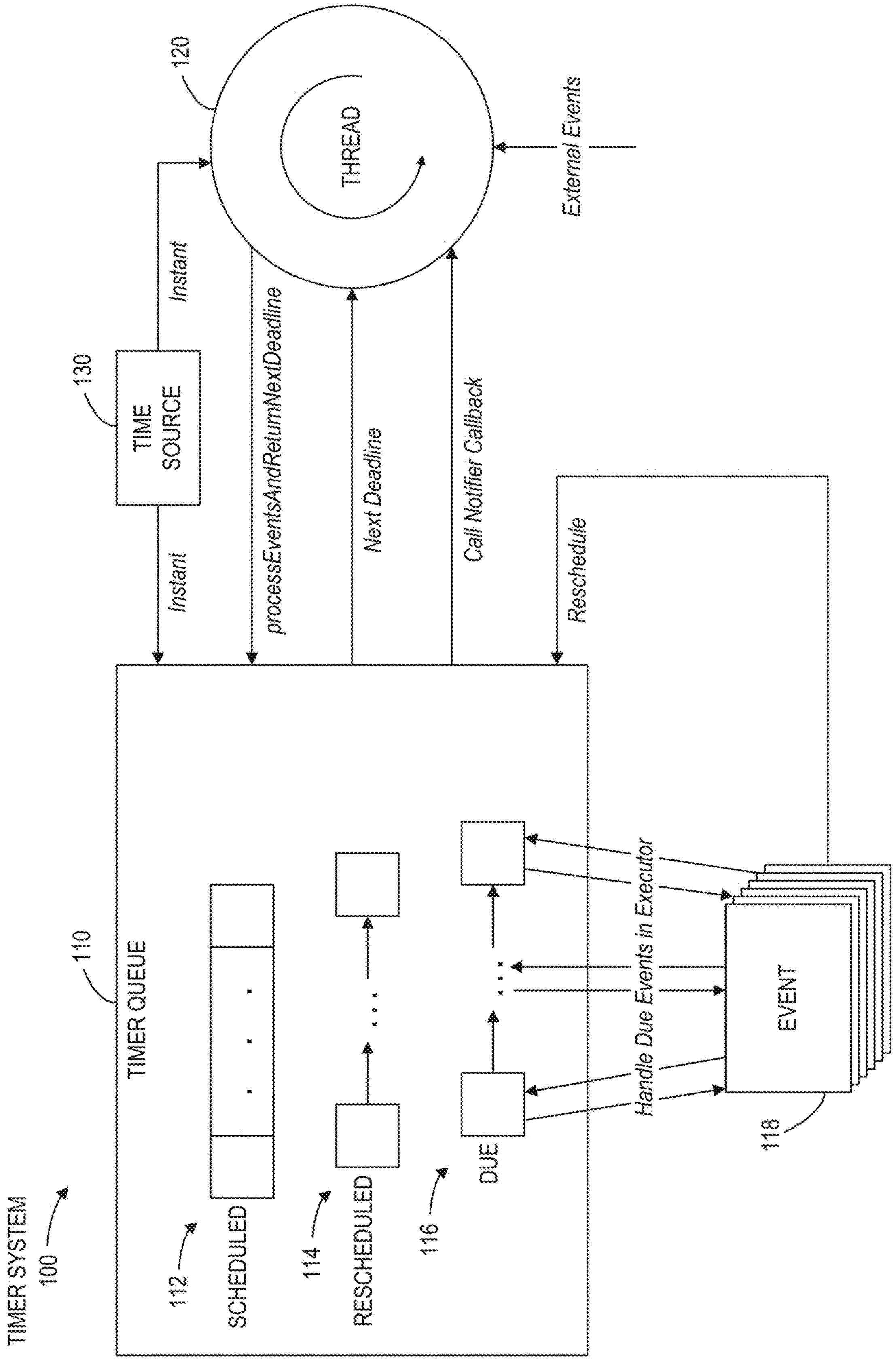
FIG. 3 illustrates an example embodiment of a timer system implementing a timer queue for self-rescheduling event tasks in accordance with one or more embodiments.

FIG. 3 illustrates an example embodiment of the timer system 100 implementing the timer queue 110 for self-rescheduling event tasks in accordance with one or more embodiments. The timer queue 110 enables events 118 that are submitted to the timer queue 110, such as from the thread 120, to be added to the queue 112 of scheduled events, removed from the queue 112 of scheduled events, and rescheduled using the collection 114 of rescheduled events. The timer queue 110 is not tied to any particular thread of execution, but is able to return its next deadline, which is the earliest deadline of all events 118 that are currently scheduled in the queue 112 of scheduled events. The timer queue 112 also offers a method to process, purge, and trigger all events 118 whose deadline is before a given deadline (e.g., the current time instant). The method can take an executor to ensure that events 118 will be triggered in a different thread than the caller, in order to not block the caller while events 118 are being processed. The method returns the next deadline, which is the earliest deadline of all submitted events 118 whose deadline is after the given deadline (e.g., the current time instant). This method is referred to herein and labeled in FIG. 3 as processEventsAndReturnNextDeadline.

In some embodiments, the timer queue 110 provides two static marker events, called FLOOR and CEILING, which implement the TimedEvent interface previously discussed. These two static marker events are built respectively with a constant deadline equal to the minimum deadline, plus a constant ID equal to Long.MIN_VALUE for the FLOOR marker event, and a constant deadline equal to the maximum deadline, plus a constant ID equal to Long.MAX_VALUE, for the CEILING event. In the queue 112 of scheduled events, values may be ordered by a comparator provided by the TimedEvent interface, which implements total ordering in the queue 112 of scheduled events. The first event in the queue 112 (e.g., at the head of the queue 112) can be easily and quickly obtained by requesting the first event that exceeds the FLOOR marker event. Similarly, the last event in the queue 112 (e.g., at the tail of the queue 112) can be obtained by querying for the last event that is less than the CEILING marker event. An application programming interface (API) for the skip list of the queue 112 of scheduled events may call scheduled.ceiling(FLOOR) to get the head of the queue 112 and scheduled.floor(CEILING) to get the tail of the queue 112. At construction time, the timer queue 110 accepts a notifier. The notifier is a trigger that can be invoked when the earliest deadline in the timer queue 110 has changed and when processEventsAndReturnNextDeadline needs to be called earlier than previously foreseen. When the notifier is triggered, the thread 120 calls processEventsAndReturnNextDeadline. In the example shown in FIG. 3, the thread 120 is a selector thread.

In one or more embodiments, the timer system 100 offering an event 118 to the timer queue 110. When a new event 118 is offered to the timer queue 110, the event 118 is put into the queue 112 of scheduled events, where the event 118 is ordered according to its deadline (and according to its ID if it has the same deadline as another event 118). If the deadline of the newly-added event 118 is before the deadline of the previous head of the queue 112, then the thread 120 is notified to shorten its waiting delay according to the earlier deadline of the newly-added event 118. Otherwise, the thread 120 does not need to be notified. Alternatively, the reschedule method can also be used. In some embodiments, the offer method is only used if the event 118 has never been added to the timer queue 110 previously, as this condition guarantees that the event 118 is not present in any of the collections maintained by the timer queue 110.

After an event 118 has been added to the queue 112 of scheduled events, the event 118 may be rescheduled in the timer queue 110. If an event 118, which is an instance of TimedEvent, reaches a condition where it needs to be rescheduled, then the event 118 reschedules itself for a later time. For example, if the event 118 has a particular deadline at which point it will trigger a retransmission of a previously-sent packet unless an acknowledgment of the previously-sent packet is received, then the event 118 may reschedule itself for a later time in response to the acknowledgment arriving. The event 118 may reschedule itself by using the reschedule mechanism to safely get its deadline refreshed to a prospective later time at which the next unacknowledged packet would need to be retransmitted. In one or more embodiments, the timer queue 110 exposes a reschedule method that takes the event 118 to be rescheduled, plus, optionally, the prospective deadline at which this event 118 should fire. When called, the reschedule method adds the event 118 to the collection 114 of rescheduled events. If no prospective deadline is offered, or if the prospective deadline is before the earliest deadline of all the events 118 in the queue 112 of scheduled events, then the thread 120 is notified. The events 118 in the collection 114 of rescheduled events will be processed later when the thread 120 is woken up. If the event 118 wants to be removed from the timer queue 110, then the event 118 can call the reschedule method with the maximum deadline.

The timer queue 110 computes which events are due. For example, when the thread 120 wakes up, it obtains the current time instant from the monotonic timeline clock of the time source 130. The thread 120 then asks the timer queue 110 to process, purge, and trigger all events whose deadline is before or at that the current time instant, such as by calling the processEventsAndReturnNextDeadline method on the timer queue 110. The processEventsAndReturnNextDeadline method takes the current time instant as an argument, as well as an optional executor. In one or more embodiments, the processEventsAndReturnNextDeadline method is implemented as follows.

First, the processEventsAndReturnNextDeadline method processes the collection 114 of rescheduled events. For each event 118 in the collection 114 of rescheduled events, the method removes the event 118 from the collection 114, and also removes it from the queue 112. At this point, the event 118 is not contained in any collection (e.g. queue or list) of the timer queue 110 that sorts events 118 according to their deadline. Then, the method asks the event 118 to refresh its deadline, such as by calling a refreshDeadline method. Because the queue 112 of scheduled events is a skip list that orders events 118 according to their deadlines, it is crucial that the deadline of an event 118 does not change while the event 118 is registered in any such list, as such a change may cause a functional error in the timer queue 110. By controlling at which point the deadline is refreshed, the timer system 100 ensures that this functional error does not occur. The refreshDeadline method may return a previously computed deadline, or may recompute a new deadline, as dictated by the underlying concrete implementation of the TimedEvent.

After the refreshDeadline method had been called, a deadline method of an event 118 should return that same deadline consistently for that event 118 until such a time that the refreshDeadline method is called again. Once the deadline of an event 118 has been refreshed, the deadline is compared to the current time instant, which is obtained from the time source 130. If the deadline is at or before the current time instant, then the event 118 is added to the collection 116 of events that are due to be processed. A local counter of due events for the collection 116 is then incremented based on the addition of the event 118 to the collection 116. If the refreshed deadline of the event 118 is determined to be after the current time instant, then the event 118 is added to the queue 112 of scheduled events instead, in order to be fired at a later time. This step continues until the collection 114 of rescheduled events is empty.

Next, the queue 112 of scheduled events is processed. The head of the queue 112 is examined. If its deadline is at or before the current time instant, then it is removed from the queue 112 and put into the collection 116 of events that are due, and the local counter of the collection 116 of events that are due is incremented. This examination of the queue 112 repeats and continues until the queue 112 of scheduled events is empty or until its head has a deadline that is after the current time instant.

If the counter of the collection 116 of events that are due is greater than zero, then the timer queue 110 determines that it has some events 118 to fire. The timer queue 110 submits all of the events 118 in the collection 116 of events that are due to an executor, such as to an executor that was included as part of the processEventsAndReturnNextDeadline request from the thread 120 to the timer queue 110. In order to ensure that the events are processed in order, a sequential scheduler may be used. A sequential scheduler is an object that is able to spin a new event loop unless the loop is already running, which ensures that there is only one thread at a given time that processes the collection 116 of due events. The sequential scheduler also ensures that the events 118 in the collection 116 are processed in order, since there is only one thread that can poll the collection 116. The timer queue 110 provides the executor to the sequential scheduler, and the sequential scheduler ensures that the loop will run in one of the executor threads, unless it is currently running.

Once the loop to process the events 118 in the collection 116 of events that are due to be processed has been started, the processEventsAndReturnNextDeadline method looks at the head of the queue 112 of scheduled events and returns its deadline, which is the next time instant at which the processEventsAndReturnNextDeadline method should be called. When the processEventsAndReturnNextDeadline method returns the deadline to the thread 120, the thread 120 then returns to its regular behavior. In some embodiments, the thread 120 returns to waiting for network data until the new deadline expires.

In some embodiments, the timer queue 110 processes events 118 from the collection 116 asynchronously, in a different thread than the selector thread that called the processEventsAndReturnNextDeadline method. This asynchronous processing allows the selector thread to go back to waiting for data to arrive as soon as possible. The loop that processes due events from the collection 116 of events that are due to be processed is implemented as follows. For each event 118 in the collection 116 of events that are due to be processed, the event 118 is first removed from the collection 116, and then the handle method of the event 118 is called. The handle method is responsible for triggering whatever action is needed to perform the corresponding task when the event 118 is fired. For example, the handle method may trigger a sending of acknowledgements or a retransmitting of lost packets. When it is not desirable that these actions are processed within the calling thread, which would hold off other events 118 until these actions are completed, the handle method may arrange for these actions to be completed asynchronously, and, if the next deadline depends on the result of these actions, it may return the maximum deadline. The task of the event 118 can then later call the reschedule method to reschedule itself after completing the actions. Otherwise, if the next deadline can already be computed, then the handle method returns the next deadline at which the event 118 should be fired. If there are no actions pending, then the handle method returns the maximum deadline.

If the handle method returns the maximum deadline, then the loop continues and it processes the next event 118 in the collection 116 of events that are due to be processed. Otherwise, the timer queue 110 adds the event 118 to the collection 114 of rescheduled events. If the deadline returned by the handle method is less than the current deadline of the timer queue 110, then the notifier is run again after having processed all due events 118. The processing of due events 118 discussed above continues until the collection 116 of events that are due to be processed is empty, at which point, the notifier may be run if the minimum deadline of any rescheduled event 118 is less than the current deadline of the timer queue 110. For example, if the minimum deadline computed above is less than the deadline that was previously returned by processEventsAndReturnNextDeadline, then the thread 120 is notified in order to trigger a new call to processEventsAndReturnNextDeadline, causing the processing of all events 118 in the collection 114 of rescheduled events in order to make the thread 120 possibly shorten its deadline.

The concurrent use of the queue 112 of scheduled events, the collection 114 of rescheduled events, and the collection 116 of events that are due to be processed enables the timer queue 100 to asynchronously add back events 118 to reschedule events 118 while the processing of events 118 is ongoing, without having to lock the queue 112, the collection 114, or the collection 116. The reschedule method and the collection 114 of rescheduled events enable the timer queue 110 to limit the number of idle wakeups in the selector thread, as events 118 whose deadline is after the current deadline can stay in the collection 114 of rescheduled events until the current deadline expires. Furthermore when using ordered queues, priority queues, or skip lists, a registered event 118 must not change any data that is used to compute its distance to other events 118. The timer queue 110 ensures that the deadline of a given event 118 is refreshed only when the event 118 has been removed from any such collection, and ensures that the event 118 is added back to the appropriate collection after its deadline has been refreshed.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
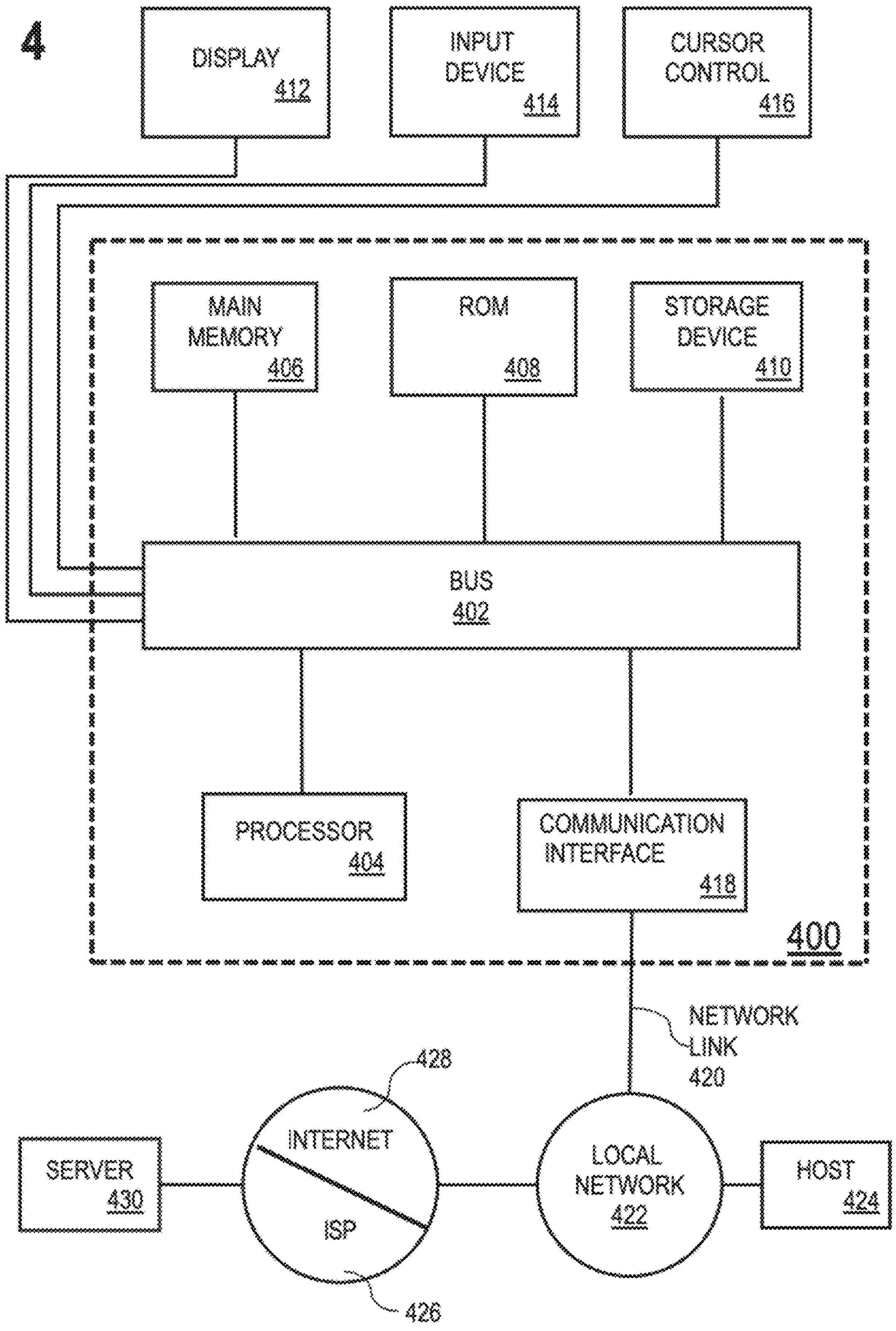
FIG. 4 a block diagram that illustrates a computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:

storing a plurality of events in a queue of scheduled events, each event in the plurality of events comprising a corresponding task that is scheduled to be executed at a corresponding particular deadline, the plurality of events being ordered in the queue of scheduled events by their corresponding particular deadline;

determining that a condition for rescheduling has been satisfied for a first event in the plurality of events, the determining that the condition for rescheduling has been satisfied for the first event comprising determining a new prospective deadline for the first event;

responsive to the determining that the condition for rescheduling has been satisfied for the first event:

adding the first event to a collection of rescheduled events;

determining that the new prospective deadline of the first event is less than a next deadline at which events are due to be processed; and sending a notification to a first thread, the notification indicating that events are to be processed;

receiving, from the first thread, a first instruction to process events, the first instruction comprising a first current time instant; and responsive to receiving the first instruction to process events:

removing the first event from the collection of rescheduled events;

if the first event is present in the queue of scheduled events, then removing the first event from the queue of scheduled events;

asking the first event to refresh its corresponding particular deadline, the asking of the first event to refresh its corresponding particular deadline causing the first event to change its corresponding particular deadline to a refreshed particular deadline; and either (a) adding the first event to the queue of scheduled events based on a determination that the refreshed particular deadline of the first event is after the first current time instant or (b) adding the first event to a collection of events that are due to be processed based on a determination that the refreshed particular deadline of the first event is at or before the first current time instant.

2. The media of claim 1, wherein, responsive to receiving the first instruction to process events, the first event is added to the queue of scheduled events based on the determination that the refreshed particular deadline of the first event is after the first current time instant, the operations further comprising:

receiving, from the first thread, a second instruction to process events, the second instruction comprising a second current time instant; and responsive to receiving the second instruction to process events:

removing the first event from the collection of rescheduled events;

adding the first event to the collection of events that are due to be processed based on a determination that the refreshed particular deadline of the first event is at or before the second current time instant; and executing the corresponding task of each event in the collection of events that are due to be processed.

3. The media of claim 1, wherein, responsive to receiving the first instruction to process events, the first event is added to the collection of events that are due to be processed based on the determination that the refreshed particular deadline of the first event is at or before the first current time instant, the operations further comprising:

executing the corresponding task of each event in the collection of events that are due to be processed.

4. The media of claim 1, wherein the operations further comprise:

determining that the corresponding task of a second event in the plurality of events in the queue of scheduled events does not need to be executed; and responsive to the determining that the corresponding task of the second event in the plurality of events in the queue of scheduled events does not need to be executed:

removing the second event from the queue of scheduled events; and setting the corresponding particular deadline of the second event to a maximum instant obtained from a monotonic timeline clock.

5. The media of claim 1, wherein the first thread comprises a selector thread that manages multiple data transfer channels.

6. The media of claim 1, wherein the queue of scheduled events comprises a skip list.

7. The media of claim 1, wherein each event in the plurality of events further comprises a corresponding identification that is unique to the event amongst the plurality of events, the corresponding identification comprising an integer that was assigned to the corresponding event when the corresponding event was created, wherein events in the queue of scheduled events that have equal corresponding particular deadlines are further ordered based on their corresponding identifications.

8. The media of claim 1, wherein the thread obtains the first current time instant from a monotonic timeline clock.

9. A method performed by at least one device including a hardware processor, the method comprising:

storing a plurality of events in a queue of scheduled events, each event in the plurality of events comprising a corresponding task that is scheduled to be executed at a corresponding particular deadline, the plurality of events being ordered in the queue of scheduled events by their corresponding particular deadline;

determining that a condition for rescheduling has been satisfied for a first event in the plurality of events, the determining that the condition for rescheduling has been satisfied for the first event comprising determining a new prospective deadline for the first event;

responsive to the determining that the condition for rescheduling has been satisfied for the first event:

adding the first event to a collection of rescheduled events;

determining that the new prospective deadline of the rescheduled event is less than a next deadline at which events are due to be processed; and sending a notification to a first thread, the notification indicating that events are due to be processed;

receiving, from the first thread, a first instruction to process events, the first instruction comprising a first current time instant; and responsive to receiving the first instruction to process events:

removing the first event from the collection of rescheduled events;

if the first event is present in the queue of scheduled events, then removing the first event from the queue of scheduled events;

asking the first event to refresh its corresponding particular deadline, the asking of the first event to refresh its corresponding particular deadline causing the first event to change its corresponding particular deadline to a refreshed particular deadline; and either (a) adding the first event to the queue of scheduled events based on a determination that the refreshed particular deadline of the first event is after the first current time instant or (b) adding the first event to a collection of events that are due to be processed based on a determination that the refreshed particular deadline of the first event is at or before the first current time instant.

10. The method of claim 9, wherein, responsive to receiving the first instruction to process events, the first event is added to the queue of scheduled events based on the determination that the refreshed particular deadline of the first event is after the first current time instant, the method further comprising:

receiving, from the first thread, a second instruction to process events, the second instruction comprising a second current time instant; and responsive to receiving the second instruction to process events:

removing the first event from the collection of rescheduled events;

if the first event is present in the queue of scheduled events, then removing the first event from the queue of scheduled events;

asking the first event to refresh its corresponding particular deadline, the asking of the first event to refresh its corresponding particular deadline causing the first event to change its corresponding particular deadline to a refreshed particular deadline;

adding the first event to the collection of events that are due to be processed based on a determination that the refreshed particular deadline of the first event is at or before the second current time instant; and executing the corresponding task of each event in the collection of events that are due to be processed.

11. The method of claim 9, wherein, responsive to receiving the first instruction to process events, the first event is added to the collection of events that are due to be processed based on the determination that the refreshed particular deadline of the first event is at or before the first current time instant, the method further comprising:

executing the corresponding task of each event in the collection of events that are due to be processed.

12. The method of claim 9, further comprising:

determining that the corresponding task of a second event in the plurality of events in the queue of scheduled events does not need to be executed; and responsive to the determining that the corresponding task of the second event in the plurality of events in the queue of scheduled events does not need to be executed:

removing the second event from the queue of scheduled events; and setting the corresponding particular deadline of the second event to a maximum instant obtained from a monotonic timeline clock.

13. The method of claim 9, wherein the first thread comprises a selector thread that manages multiple data transfer channels.

14. The method of claim 9, wherein the queue of scheduled events comprises a skip list.

15. The method of claim 9, wherein each event in the plurality of events further comprises a corresponding identification that is unique to the event amongst the plurality of events, the corresponding identification comprising an integer that was assigned to the corresponding event when the corresponding event was created, wherein events in the queue of scheduled events that have equal corresponding particular deadlines are further ordered based on their corresponding identifications.

16. The method of claim 9, wherein the thread obtains the first current time instant from a monotonic timeline clock.

17. A system comprising:

at least one device including a hardware processor;

the system being configured to perform operations comprising:

storing a plurality of events in a queue of scheduled events, each event in the plurality of events comprising a corresponding task that is scheduled to be executed at a corresponding particular deadline, the plurality of events being ordered in the queue of scheduled events by their corresponding particular deadline;

determining that a condition for rescheduling has been satisfied for a first event in the plurality of events, the determining that the condition for rescheduling has been satisfied for the first event comprising determining a new prospective deadline for the first event;

responsive to the determining that the condition for rescheduling has been satisfied for the first event:

adding the first event to a collection of rescheduled events;

determining that the new prospective deadline of the first event is less than a next deadline at which events are due to be processed; and sending a notification to a first thread, the notification indicating that events are to be processed;

receiving, from the first thread, a first instruction to process events, the first instruction comprising a first current time instant; and responsive to receiving the first instruction to process events:

removing the first event from the collection of rescheduled events;

if the first event is present in the queue of scheduled events, then removing the first event from the queue of scheduled events;

asking the first event to refresh its corresponding particular deadline, the asking of the first event to refresh its corresponding particular deadline causing the first event to change its corresponding particular deadline to a refreshed particular deadline; and either (a) adding the first event to the queue of scheduled events based on a determination that the refreshed particular deadline of the first event is after the first current time instant or (b) adding the first event to a collection of events that are due to be processed based on a determination that the refreshed particular deadline of the first event is at or before the first current time instant.

18. The system of claim 17, wherein, responsive to receiving the first instruction to process events, the first event is added to the queue of scheduled events based on the determination that the refreshed particular deadline of the first event is after the first current time instant, the operations further comprising:

receiving, from the first thread, a second instruction to process events, the second instruction comprising a second current time instant; and responsive to receiving the second instruction to process events:

removing the first event from the collection of rescheduled events;

if the first event is present in the queue of scheduled events, then removing the first event from the queue of scheduled events;

asking the first event to refresh its corresponding particular deadline, the asking of the first event to refresh its corresponding particular deadline causing the first event to change its corresponding particular deadline to a refreshed particular deadline;

adding the first event to the collection of events that are due to be processed based on a determination that the refreshed particular deadline of the first event is at or before the second current time instant; and executing the corresponding task of each event in the collection of events that are due to be processed.

19. The system of claim 17, wherein, responsive to receiving the first instruction to process events, the first event is added to the collection of events that are due to be processed based on the determination that the refreshed particular deadline of the first event is at or before the first current time instant, the operations further comprising:

executing the corresponding task of each event in the collection of events that are due to be processed.

20. The system of claim 17, wherein the operations further comprise:

determining that the corresponding task of a second event in the plurality of events in the queue of scheduled events does not need to be executed; and responsive to the determining that the corresponding task of the second event in the plurality of events in the queue of scheduled events does not need to be executed:

removing the second event from the queue of scheduled events; and setting the corresponding particular deadline of the second event to a maximum instant obtained from a monotonic timeline clock.

* * * * *